United States Patent
Solferino et al.

(10) Patent No.: US 8,844,502 B2
(45) Date of Patent: Sep. 30, 2014

(54) FUEL RAIL MOUNT

(75) Inventors: Vince P. Solferino, Dearborn, MI (US); Paul W. Zeng, Inkster, MI (US); Patrick C. Brostrom, Livonia, MI (US); Michael R. Kaput, Canton, MI (US); Scott Lehto, Walled Lake, MI (US); Syed M. Ahmed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 267 days.

(21) Appl. No.: 13/556,341

(22) Filed: Jul. 24, 2012

(65) Prior Publication Data

US 2014/0026401 A1 Jan. 30, 2014

(51) Int. Cl.
*F02M 61/14* (2006.01)
*F02M 61/18* (2006.01)

(52) U.S. Cl.
USPC ........................................ 123/470; 123/456

(58) Field of Classification Search
USPC ...... 123/470, 456, 468, 469, 198 E; 277/591, 277/595, 626, 627, 647, 653
See application file for complete search history.

(56) References Cited

U.S. PATENT DOCUMENTS

| 1,963,535 | A | * | 6/1934 | Trotter | 411/156 |
| 5,056,975 | A | * | 10/1991 | Ando | 411/155 |
| 6,340,019 | B1 | | 1/2002 | Eshleman et al. | |
| 6,939,097 | B2 | * | 9/2005 | Carr et al. | 411/368 |
| 7,527,038 | B2 | | 5/2009 | Watanabe et al. | |
| 8,701,632 | B2 | * | 4/2014 | Solferino et al. | 123/470 |
| 2008/0075403 | A1 | * | 3/2008 | Holt et al. | 384/551 |
| 2010/0012093 | A1 | | 1/2010 | Pepperine et al. | |

\* cited by examiner

*Primary Examiner* — Mahmoud Gimie
(74) *Attorney, Agent, or Firm* — James Dottavio; MacMillan, Sobanski & Todd, LLC

(57) ABSTRACT

An internal combustion engine direct injection fuel injector system includes a fuel rail which is welded to a fuel rail bracket. A fuel rail mounting sleeve has a flange and is bolted to the engine cylinder head. The bracket fits around the flange and is held in place by a steel washer and a pair of stepped isolator washers which are positioned in pockets formed on either side of the bracket. The isolator washers serve as springs which form a shock absorber between the bracket and cylinder head. Compression forces on the bracket and isolator washers are controlled by bolt tension.

11 Claims, 2 Drawing Sheets

FUEL RAIL MOUNT

TECHNICAL FIELD

The present invention relates to internal combustion engine fuel injection systems, and more particularly to the mounting of fuel rails of such systems.

BACKGROUND OF THE INVENTION

Direct injection is a common type of fuel injection system in which fuel is injected directly into the combustion chambers of an internal combustion engine by fuel injectors. A fuel rail, typically a tubular member, connects the fuel injectors to a fuel supply. Fuel injectors are typically mounted in fuel injector sockets in the fuel rail. Fuel rails in direct injection fuel systems are commonly mounted on the engine's cylinder head.

Direct injection fuel rails experience significantly higher fuel pressures than other types of fuel injection systems. High-pressure fuel pumps used in these systems commonly create pressure pulsations that can cause the fuel rail to vibrate. This can create undesirable noise, especially noticeable at idle speeds. Forces originating from the structure of fuel injectors can also cause undesirable noise, such as that caused by the energizing of magnetic solenoid valves and the impact of injector pins seating at injector closing. These fuel rail and injector noises travel directly to the cylinder head on which the fuel rail is mounted, and from there to other engine components such as the oil pan, front cover, cam cover, and intake manifold.

Attempts to alleviate noise problems have included the use of elastomeric washers or O-rings in the fuel rail mounting assembly to dampen vibrations. However, it is difficult to control vibration frequencies with elastomeric components. In addition, elastomers are subject to relatively rapid wear which can change the elastomeric characteristics.

A simple fuel rail mounting assembly is needed that can support relatively high fuel pressure and combustion pressure loads while reducing engine noise.

SUMMARY OF THE INVENTION

The present invention is a fuel rail mounting assembly for attaching a fuel rail to an engine cylinder head. The mounting assembly includes a bracket attached to the fuel rail, a fastener for attaching the bracket to the cylinder head, and a metal shock absorber positioned between the bracket and the fastener to dampen vibrations between the fuel rail assembly and the cylinder head. Preferably, the metal shock absorber includes springs on either side of the bracket which are compressed between the cylinder head and a bolt which is threaded into the cylinder head. A sleeve may be provided between the cylinder head and one of the springs to properly position the bracket.

DESCRIPTION OF PREFERRED EMBODIMENTS

Figure 1:
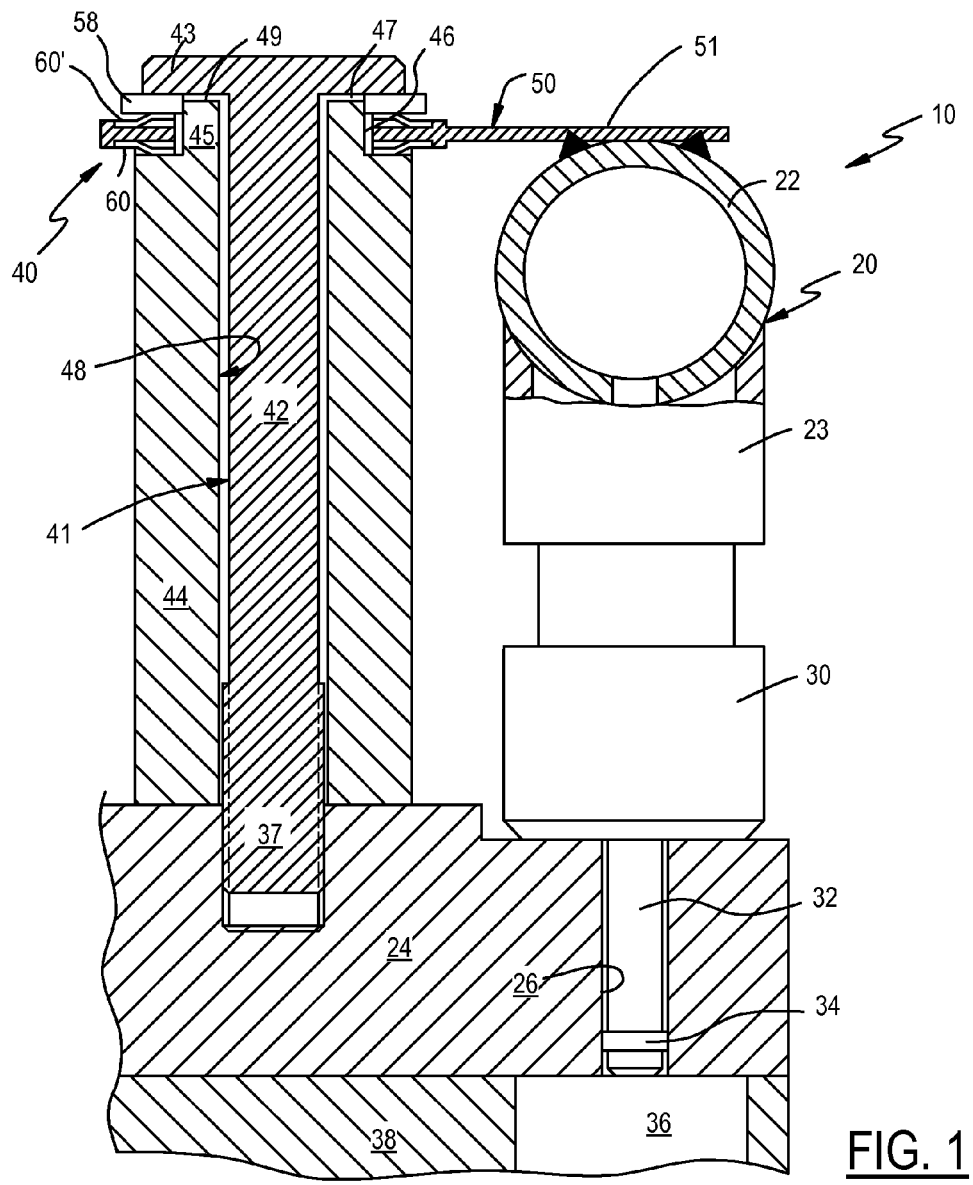
FIG. 1 is a cross-sectional view of a fuel rail mounting system in accordance with the present invention.

Referring to FIG. 1, a direct injection fuel injector system 10 includes a fuel rail assembly 20 including a fuel rail 22. A fuel rail cap 23 is welded or otherwise secured to the fuel rail 22. A fuel injector 30 is supported within the fuel rail cap 23. The injector 30 rests on an internal combustion engine cylinder head 24, but the invention is suitable for use with suspended injectors as well which may be in communication with a combustion chamber through an engine block or a cylinder head. An injector nozzle 32 extends into a bore 26 in the cylinder head 24 to provide fluid communication with a combustion chamber 36 in the engine block 38. An annular Teflon seal 34 fits snuggly around the nozzle 32 and sealingly engages the bore 26 to seal the combustion chamber 36. The seal 34 may experience limited axial sliding relative to the bore 26. The fuel rail 22 is welded to an arm 51 of a fuel rail bracket or clip 50 which supports the fuel rail assembly. Stainless steel is a preferred material for the fuel rail 22, cap 23, and bracket 50, but other materials maybe used as well.

The fuel rail assembly is mechanically mounted on the cylinder head 24 with a shock absorbing mounting assembly 40. The mounting assembly 40 includes a fastener in the form of a mounting bolt 41 having a head 43, a shaft 42, and a threaded end 37 opposite the head 43. In a preferred embodiment, the bolt 41 is a standard M8 bolt having a shaft diameter of approximately 7.7 millimeters, but other sizes may be preferred depending on the engine, the size and weight of the fuel rail assembly 20, etc. In addition, other types of fasteners may be used, such as a screw, rivet, etc.

The bolt shaft 42 extends through a cylindrical mounting sleeve 44 and is threaded into the cylinder head 24. The sleeve 44 positions the fuel rail assembly 20 at a desired height. A cylindrical opening 48 in the sleeve 44 is slightly larger than the bolt shaft diameter to allow a small radial clearance therebetween, forming an annular gap. Of course, the sleeve 44, opening 48, and bolt shaft 42 can have other cross-sectional shapes, such as square.

The upper end of the mounting sleeve 44 includes a reduced diameter flange 45 for aligning the stacked mounting assembly components. Together, the sleeve 44, flange 45, and bolt head 43 define an annular channel 46. A small annular gap 47 is defined by the top surface 49 of the flange 45 and the bolt head 43. The bracket 50, a pair of isolator washers 60, 60', and a washer 58 are stacked in the channel 46. The illustrated flange 45 and apertures in the bracket 50, isolator washers 60, 60' and washer 58 are cylindrical, but other shapes are possible, such as a square shape.

Figure 2:
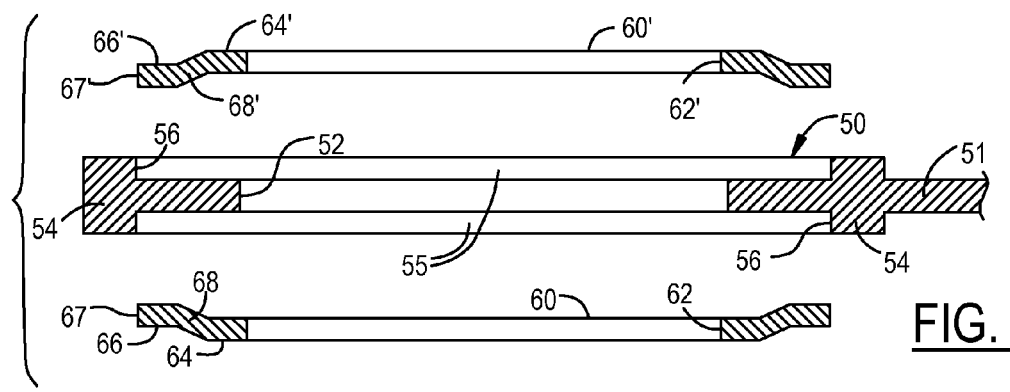
FIG. 2 is an exploded cross-sectional view of components of the mounting system of FIG. 1.

Referring to FIG. 2, the fuel rail mounting bracket 50 has a aperture 52 that fits around the sleeve flange 45. The bracket 50 includes an annular flange 54 that defines two opposing annular pockets 55 defined by annular walls 56. Pockets 55 provide seats for the isolator washers 60, 60'.

Isolator washers 60, 60' are stainless steel for compatibility with bracket 50, but other materials, such as plastics, may be acceptable as well. Isolator washers 60, 60' have a stepped configuration. Each isolator washer 60, 60' has a cylindrical center aperture 62, 62', respectively, with a diameter substantially the same as that of the bracket aperture 52, about 8.2 millimeters in one preferred embodiment. The bracket aperture 52 and isolator washer apertures 62, 62' are slightly larger than the outer diameter of the flange 46, thereby leaving a small annular gap therebetween. Contact of the isolator washers 60, 60' with the sleeve flange 45 could alter the stiffness and reduce effectiveness of the isolator washers 60, 60', and therefore is preferably avoided. While the preferred embodiment includes two isolator washers 60, 60', a single isolator washer may be used in certain applications.

Each isolator washer 60, 60' has a generally planar inner annular portion 64, 64' which respectively define the apertures 62, 62', and a generally planar outer annular portion 66, 66'. Frusto-conical intermediate portions 68, 68' connect the inner and outer portions of the isolator washers 60, 60'.

The illustrated isolator washers 60, 60' are identical but are reversed or flipped relative to each other to engage the bracket 50, washer 58 and sleeve 44. The annular outer portion 66, 66' of each isolator washer is seated in a bracket pocket 55. The diameter of the outer peripheral annular walls 67, 67' of the isolator washers 60, 60' is about 15.5 millimeters in one preferred embodiment. The diameter of each pockets 55 is slightly larger than that of the isolator washers 60, 60' to allow limited radial expansion of the isolator washers 60, 60' within the pockets 55.

Referring again to FIG. 1, the bracket inner annular portions 64, 64' contact the flange 44 and washer 58, respectively, but do not contact the bracket 50. Washer 58 is positioned between the bolt head 43 and the top isolator washer 60'. The washer 58 may have an outer diameter less than that of the isolator washers 60, 60' because it engages only the inner annular portion 64' of the top isolator washer 60'. Washer 58 can be steel and does not need to be compatible with the isolator washer material. Washer 58 protects the top isolator washer 60' from damage during the torque-down procedure. However, as will be apparent to those skilled in the art, the washer 58 may not be necessary in certain applications.

During assembly, the bottom isolator washer 60 is positioned around the flange 45. Next, the bracket 50 is positioned around the flange 45, followed by the top isolator washer 60'. Washer 58 is then positioned on the bolt shaft 42 adjacent the head 43. The bolt 41 is then inserted into the sleeve 44 and threaded into the cylinder head 24 to the extent that the isolator washers 60, 60' are compressed to a desired degree, as measured by a torque wrench, to lock the bracket 50 in place. This compression can create a preload of about 800 Newtons in a preferred embodiment, but the amount of compression could range from about 500 to 1500 Newtons or more, depending on the particular fuel rail to be supported. After compression, the isolator washers 60, 60' serve as lock washers to prevent the bolt 41 from backing out of the threaded hole in the cylinder head 24.

The isolator washers 60, 60' provide a tunable stiffness to the mounting assembly that allows for calculation and more control over vibration frequencies. The isolator washer intermediate portions 68, 68' deflect to absorb any desired compression. The clamping forces exerted on the bracket 50 by the isolator washers 60, 60' can readily be calibrated because the deflection of the isolator washers 60, 60' can be controlled. Radial expansion of the isolator washers 60, 60' under compression is minimal.

In a preferred embodiment, the metal thickness of each of the inner, outer and intermediate portions of the isolator washers 60, 60' is about 1.3 millimeters, while the total pre-stressed axial thickness of each of the isolator washers 60, 60' is about 1.5 millimeters. After loading, the total thickness of each isolator washer 60, 60' could be reduced to about 1.4 millimeters.

The height of the sleeve flange 45 is such that the desired compression level of the isolator washers 60, 60' will be reached before the bolt head 43 bottoms out on the top surface 49 of the flange 45. Alternatively, the height of the flange 45 could be calculated to allow optimum compression when the bolt head 43 bottoms out against the top surface 49 of the flange 45. This would allow threading of the bolt 40 without determining a compression level with a torque wrench. However, this method may require precise calculations for each different engine or fuel rail assembly design, as opposed to using a torque wrench setting which may be more consistent for most engine or fuel rail designs.

When preloaded, the frusto-conical shaped intermediate sections 68, 68' of the isolator washers 60, 60' deform, thereby acting as a spring. Adequate spring stiffness can be designed to reduce unwanted high frequency force transmitted to the cylinder head 24 at idle conditions. When the engine is running at speeds other than idle, dynamic loads applied by the fuel rail 22 will increase, which will cause the isolator washers 60, 60' to compress further and become more rigid to limit fuel rail vibration. This also limits movement and increases durability of the injector seals 34. Isolator stiffness and maximum compression or displacement can be controlled by the metal thickness, total height, conical shape, and diameters of the isolator washers 60, 60'.

Figure 3:
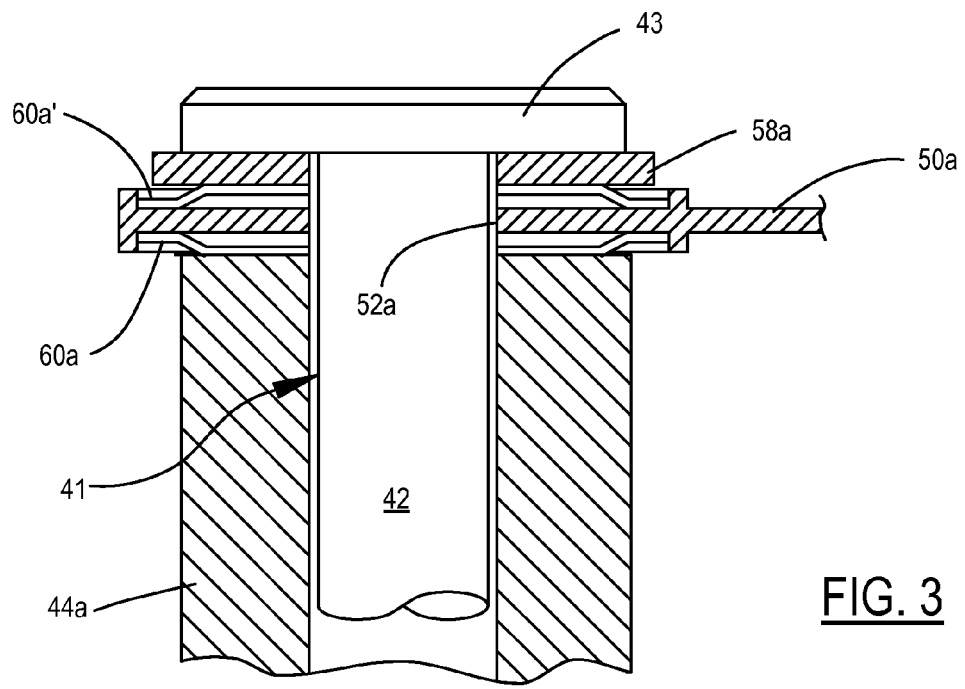
FIG. 3 is a cross-sectional view of an alternative embodiment of the fuel rail mounting system of the present invention.

Referring to FIG. 3, an alternative embodiment of the invention utilizes a sleeve 44a without a flange. If the same bolt 41 of the first embodiment is used, the total height of the sleeve 44a may be the same as that of sleeve 44 including the flange 45. In other words, a similar sleeve may be used without forming a groove to create the flange 45. Of course, the sleeve 44a may have any height depending on the engine and fuel rail assembly design, with the bolt length matched accordingly.

In the embodiment of FIG. 3, the diameter of the bracket aperture 52a is smaller than that of aperture 52 of the bracket 50 to more closely fit around the bolt shaft 42. The aperture diameters of the washer 58a and isolators 60a, 60a' are similarly smaller. Optionally, the bracket 50, washer 58 and isolators 60, 60' of FIG. 1 could be used with a sleeveless flange and a bolt having a larger shaft diameter.

Figure 4:
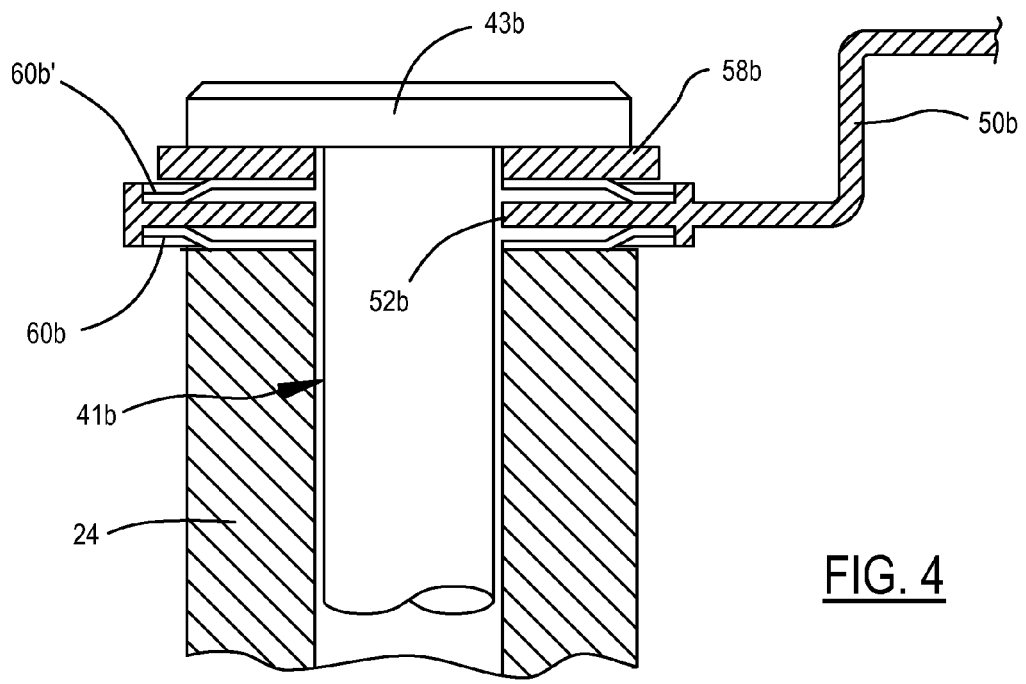
FIG. 4 is a cross-sectional view of another alternative embodiment of the fuel rail mounting system of the present invention.

FIG. 4 discloses another alternative embodiment of the invention in which a bracket 50b, isolators 60b, 60b', and optionally a washer 58b, are bolted directly to the cylinder head by bolt 41b. This embodiment eliminates any sleeves such as 44, 44a of the embodiments shown in FIGS. 1 and 3. In this embodiment, it may be necessary for the bracket 50b to be shaped differently (as shown) to mount the fuel rail at a proper location relative to the cylinder head 24.

The descriptions of specific embodiments of the invention herein is intended to be illustrative and not restrictive. The invention may be practiced otherwise than as specifically explained and illustrated without departing from its spirit or scope as defined by the appended claims.

What is claimed is:

1. An assembly for mounting a fuel rail assembly on an internal combustion engine, the fuel rail assembly including a fuel rail and a bracket attached to the fuel rail, the assembly comprising;
   a. a sleeve,
   b. a bolt for attaching the sleeve to the engine, the bolt having a head, the bracket positioned between the bolt head and the sleeve,
   c. a first isolator washer positioned between the sleeve and the bracket, and
   d. a second isolator washer positioned between the bolt and the bracket,
   wherein the bolt and sleeve form a channel, and wherein the bracket and the first and second isolator washers are positioned within the channel.

2. A fuel rail mounting assembly as defined in claim 1 wherein the bolt comprises a shaft with a longitudinal axis, the sleeve comprises an axially extending flange which defines a portion of the channel, and wherein the bolt head defines a portion of the channel.

3. A fuel rail mounting assembly as defined in claim 2 further comprising a washer positioned within the channel between the bolt head and the second isolator washer.

4. A fuel rail mounting assembly as defined in claim 3 wherein the channel is generally U-shaped and has a radially inner surface, wherein the bracket is spaced from the radially inner surface of the channel.

5. A fuel rail mounting assembly as defined in claim 4 wherein the first and second isolator washers are spaced from the radially inner surface of the channel.

6. A fuel rail mounting assembly as defined in claim 3 wherein the sum of the thicknesses of the bracket, the washer, the pre-stressed first isolator washer, and the pre-stressed second isolator washer is greater than the axial length of the flange.

7. An assembly for mounting a fuel rail assembly on an internal combustion engine, the fuel rail assembly including a fuel rail and a bracket attached to the fuel rail, the assembly comprising;
 a. an axially extending sleeve having a top surface and a reduced perimeter section below the top surface,
 b. a bolt for attaching the sleeve to the engine, the bolt having a head extending radially beyond the sleeve top surface to form a channel with the reduced perimeter section of the sleeve, the bracket positioned within the channel,
 c. a first isolator washer detached from the sleeve and axially positioned between the sleeve and a first surface of the bracket,
 d. a second isolator washer detached from the sleeve and axially positioned between the top surface of the sleeve and a second surface of the bracket,
 wherein the bolt head engages the top surface of the sleeve to prevent excessive compression of the first and second isolator washers.

8. A fuel rail mounting assembly as defined in claim 7 further comprising a washer axially positioned between the bolt head and the first isolator washer.

9. A fuel rail mounting assembly as defined in claim 7 wherein the bracket is radially spaced from the reduced perimeter section of the sleeve.

10. A fuel rail mounting assembly as defined in claim 7 wherein the first and second isolator washers are radially spaced from the reduced perimeter section of the sleeve.

11. A fuel rail mounting assembly as defined in claim 8 wherein the sum of the axial thicknesses of the bracket, the washer, the pre-stressed first isolator washer, and the pre-stressed second isolator washer is greater than the axial length of the reduced perimeter section of the sleeve.

\* \* \* \* \*